Sheet 1-3 Sheets

C. O. Crosby
Machine for Making Fish-Hooks,
Nº 46,644. Patented Mar. 7, 1865.

Fig. 2½.

Witnesses:
Inventor:

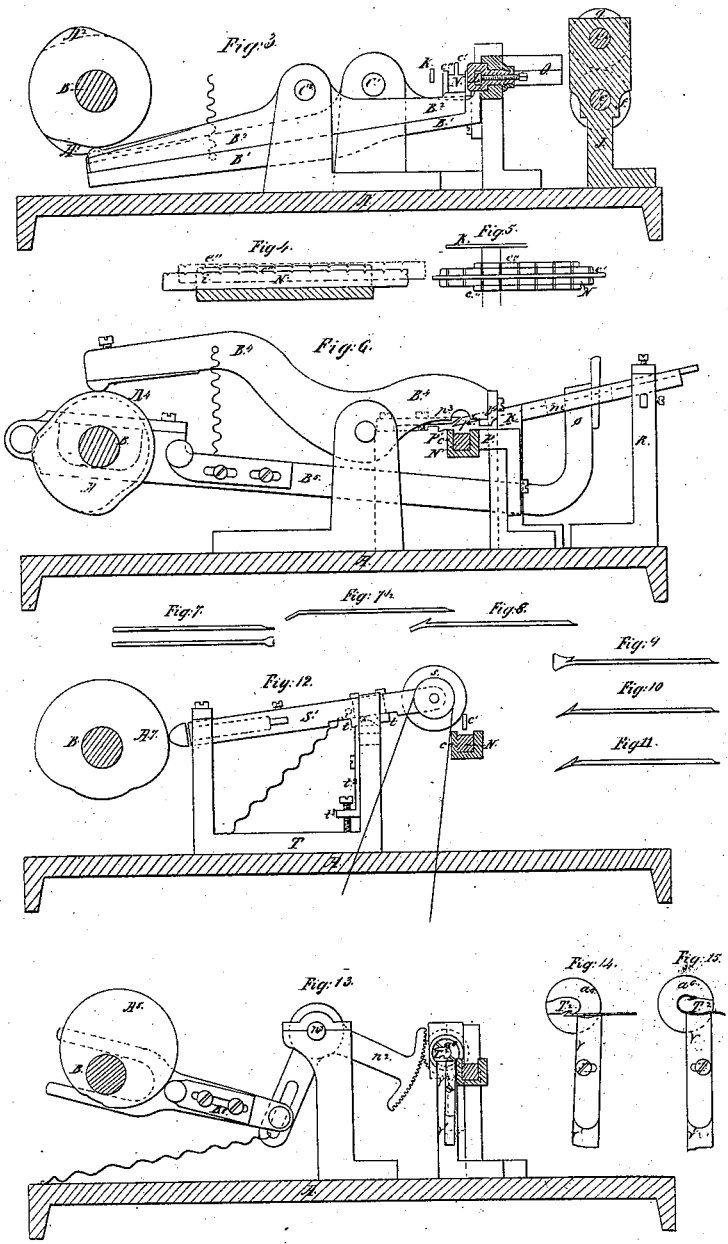

C. O. Crosby,
Machine for Making Fish-Hooks,
N° 46,644. Patented Mar. 7, 1865.
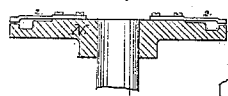
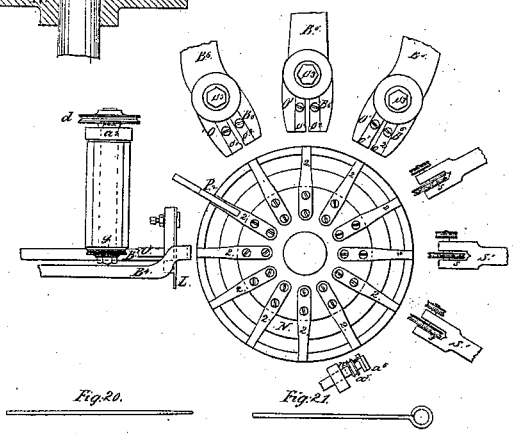
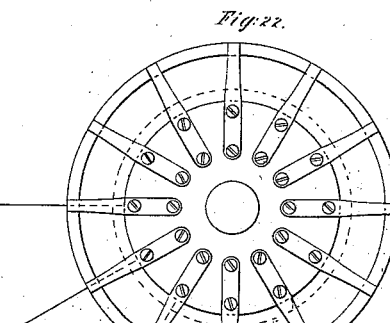
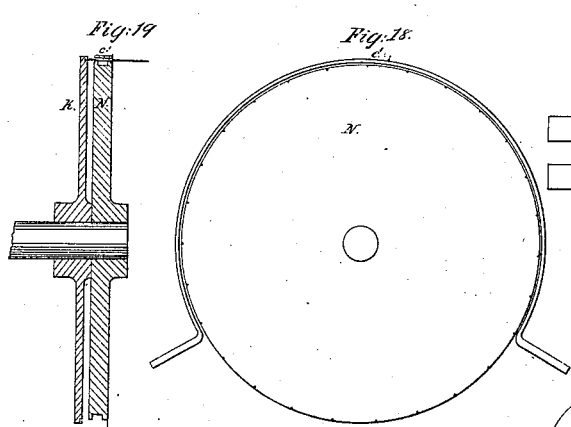
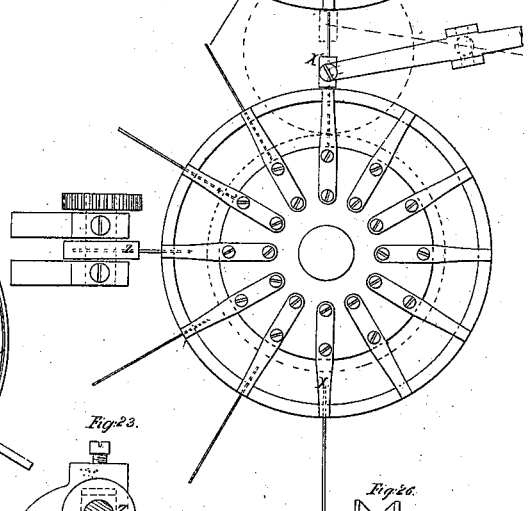
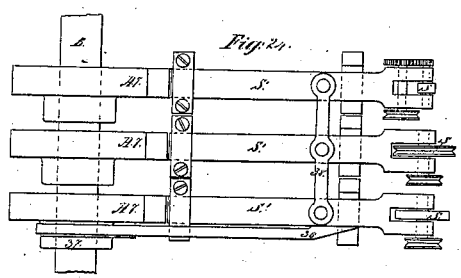
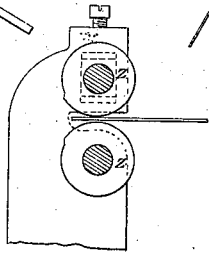
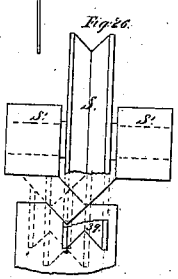
Witnesses:
Inventor:

UNITED STATES PATENT OFFICE.

C. O. CROSBY, OF NEW HAVEN, CONNECTICUT.

IMPROVEMENT IN MACHINES FOR MAKING FISH-HOOKS.

Specification forming part of Letters Patent No. 46,644, dated March 7, 1865.

*To all whom it may concern:*

Be it known that I, C. O. CROSBY, of New Haven, in the county of New Haven and State of Connecticut, have invented a new and useful Improvement in Machines for the Manufacture of Fish-Hooks; and I do hereby declare the following to be a full, clear, and exact description of the construction and operation of the same when taken in connection with the accompanying drawings and the letters of reference marked thereon, and which said drawings constitute part of this specification, and represent, in—

Figure 1:
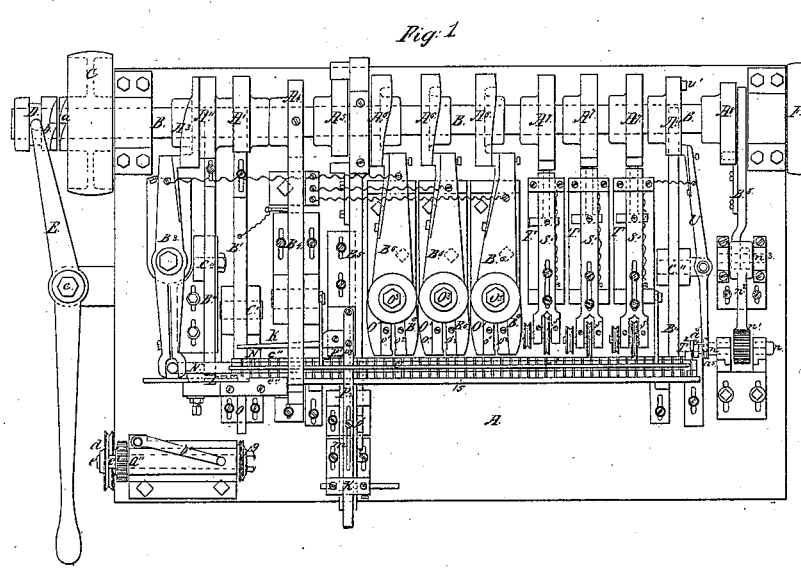
Figure 2:
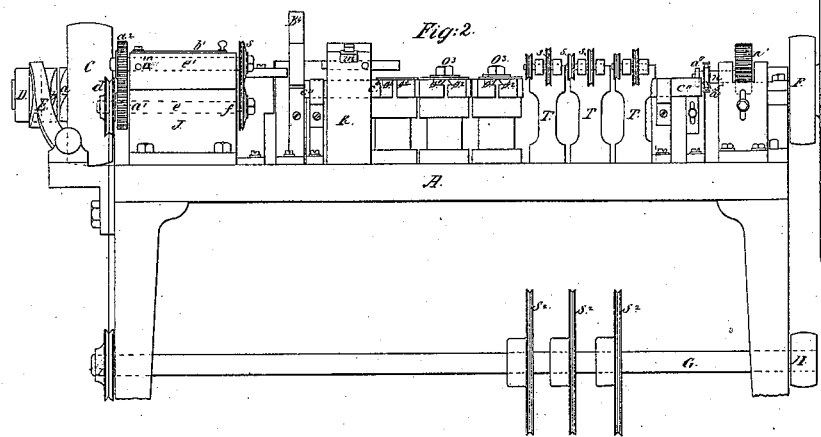
Figure 2:
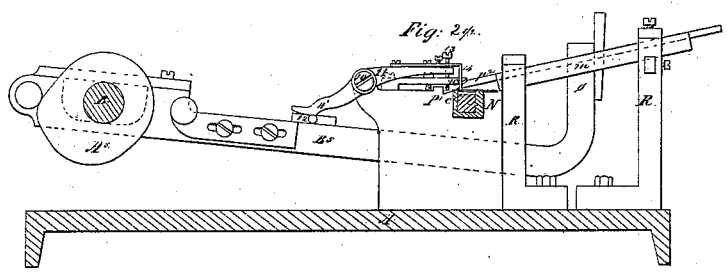

Figure 1, a plan view; Fig. 2, a front side view; Figs. 2½ to 15, inclusive, detached views, enlarged, to illustrate the several operations performed by the machine. Figs. 16, 17, 18, 19 illustrate equivalent devices for the same operation. Figs. 20, 21 represent two forms for the head of a hook. Figs. 22 and 23 are illustrations to show that different forms of hooks may be made by equivalent devices; Figs. 24, 25, 26, arrangements and adjustment of the grinding wheels or mills; Figs. 27 and 28, Kirby bender.

Same letters and characters in the different figures indicate like parts.

To enable those skilled in the art to make and use my machine, I will proceed to describe its construction and operation.

A is the bed-plate on which the operative mechanism is placed.

B is a driving-shaft.

C is a driving-pulley loose upon the shaft B, with teeth or catches $a$ formed on its hub.

D is a clutch arranged so as to slide freely axially on the shaft B, and at the same time to cause the shaft to revolve when the teeth or catches $b$ are closed into similar teeth, $a$, on the pulley C for that purpose.

E is a shipper, with its fulcrum at $e$ to clutch and unclutch the power from the machine.

F is a pulley fixed to the driving-shaft for the purpose of imparting motion to a counter-shaft, G, through a belt connecting and driving the pulley H, fixed to the said counter-shaft G. At the opposite end of the said counter-shaft I fix a grooved pulley, I. From this, by a belt, (denoted in red,) I carry power to another grooved pulley, $d$, attached to a shaft, $e$. This shaft $e$ is supported by and revolves in a support, J. Above it I place another shaft, $e'$, driven by cog-wheels $a'\, a^2$. The bearing of this upper shaft, $e'$, is hung at $a'''$, so that the other or inner end can be raised or lowered as occasion may require. On the opposite or inner ends of each of these two shafts I fix a feed-roll, $f$ and $g$, with a slight groove in their periphery. These rolls are made to revolve rapidly. Between them I introduce the end of the wire from which I am to form the hook. A spring, $b'$, pressing upon the bearing of the upper shaft, yields and allows the upper roll to rise sufficiently to admit the wire into the groove of the two rolls, and at the same time presses with sufficient force to cause the revolution of the rolls to carry the wire in through the guide O until it reaches the stop K. This stop is made adjustable, so as to allow a variation of length of wire for different-sized hooks. When the wire is thus drawn in until its end comes against the said stop the rolls will still continue to revolve; but as the wire cannot be drawn farther they will slip upon the wire. When the wire is in, as before described, its end rests against the stop K to govern the length of the wire to the size of the hook to be formed. A cutter, L, lying beneath the wire, (see Fig. 3,) is forced up by the action of the cam A' through the lever B', said lever having its fulcrum at C', one end operated by the cam, the other end operating to raise the cutter for the purpose described. Thus one piece or length of wire is cut and rests upon the rack $c^2$ in one of the grooves $e''$, (see Figs. 4 and 5,) the red line denoting the wire. Over this rack is a holder, $c'$, which rests upon the wire to hold it in the grooves.

N is a carrier lying in the rack $c^2$, and rests on one end of each of the two levers $B^2$ and $B^2$, which have their fulcrums at $c^2$, the other ends operated by the cams $A^2$ to raise and lower the said carrier N, which also has a lateral motion given it by the lever $B^3$, one end of which is attached to the carrier N, the other operated by the cam $A^3$ to give it the required movement. When the wire has been cut, and, as before stated, rests upon the rack, the carrier rises (see Fig. 4) until it takes the wire in one of its grooves, (these grooves are formed to correspond with the grooves of the rack,) and by a lateral movement given it by the cam $A^3$ carries the wire along to the next groove, as denoted in blue. (See Fig. 5.) When in this position the carrier drops and leaves the wire in the second groove; then returns to its first position. When the carrier has thus returned, the cutter is removed from before the wire-passage, where it was left when it cut the first piece, and no resistance being offered, the wire will be drawn, in again, as before and cut off. While this is being done the second operation, which is to flatten the head, is performed in the following manner: When by the successive operations as last described, the cutting is continued and the several wires so cut are advanced one of the grooves each revolution, and when by this advancement the first wire shall have been set into the groove beneath the lever $B^4$, its outer end rests upon the anvil P, (see Fig. 6,) and as the revolution of the shaft continues the cam acts upon the said lever to press down upon the end of the wire until it presses it into the proper shape, as denoted in Fig. 7, enlarged. This forms the head of the hook. The lever $B^4$, after having accomplished its work, rises, the headed wire is advanced one notch, and a second rests upon the anvil for the same operation. After the head is flattened, as described, it is necessary to hold the wire so that the flat side of the head be upward. So as properly to do this and prevent the several headed wires from turning, I attach a guide, 15, Figs. 1 and 12, to the rack, in which I form a groove to receive the flattened head of each wire. This guide rises with the carrier and holds the several wires in the proper position to present them for the several operations to be afterward performed. Thus flattened, the wire is ready for the third operation, which is the barb. The several pieces are carried along, as before described, until the first rests upon the block $P'$ (see Fig. 6) and under the barb-cutter $P^2$, (the wire represented in blue). This cutter is fixed to a holder, $m$. Said holder works in the supports R to and from the block $P'$ by the action of the cam $A^5$, through the lever $B^5$, the end of which connects with the holder. The cutter is adjusted so that as it advances toward the block $P'$ it will enter under the guide $P^3$ and strike the wire and cut into it to form the barb. Previous to cutting the barb operation I bend the end of the wire into the form nearly as shown in Fig. 7½, and cut the barb from the angle downward. I make this bend during the descent or movement of the barb-cutter in the following manner: In a bearing, 10, I hang a lever, 11, one end, 11', made to rise and fall by means of an adjustable cam, 12, attached to the lever $B^5$, operating upon the inclined plane formed on the end of the said lever 11. In the other end of the said lever 11 I place an adjustable presser, 13, and also attach to the same lever a holder, 14. As the barb-cutter descends the lever 11 is moved so as to force the presser down onto and bend the end of the wire, as shown in Fig. 7½, the holder 14 assisting in the operation by preventing the wire from springing up. The presser and holder remain on the wire until the barb is cut. On the return of the cutter the lever 11 is released and the presser and holder rise, the barbed wire is carried away, a second left upon the block for the same operation, and so on, successively cutting each wire as it is presented, and they are carried on for the fourth operation, which is pressing and clipping the inner end to form the point. This may be done at one operation; but I prefer more than one, and I have represented three instruments alike in construction and operation, except it may be in the form of the cutters or dies. These are represented in Figs 1 and 2. $o'$ and $o^2$ are cutters or dies, one upon a fixed jaw, $O'$ and $o^2$, the other upon movable jaws B. These movable jaws turn upon a fulcrum, $O^3$, and are operated by cams $A^6$ to open or close the said cutters or dies $o'$ $o^2$. As the wires are successively advanced and each inner end drops between the first pair of dies the said dies are closed by the action of the cams $A^6$, and the inner end is pressed into the form shown in Fig. 9. It then passes on to the second pair, which cuts away a portion of the end to form the point. This operation leaves the wire in the form as shown in Fig. 10. The third pair simply serve to finish the barb by pressing it into its proper form. (See Fig. 11.) To properly present the prepared point for the fifth operation of grinding and polishing, which is performed by one or more grinding-wheels, S, (shown enlarged in Fig. 12,) I represent them alike in construction and operation, except the second and third may present a finer cutting-surface for the purpose of finishing the points more perfectly. The wheels are hung in the end of a sliding bar, $S'$, the said bar supported in the frame. T $t\,t$ are cams (see Fig. 12) adjustably fixed to the bar $S'$ to raise the wheel as it advances toward the wire to properly act upon the point to be ground, and are made adjustable by the slide $t^2$, which may be raised or lowered by the set-screw $t^3$. The wheels are driven by belts from grooved pulleys $S^2$ on the counter-shaft G. They are advanced as each point is presented by the cams $A^7$, acting upon the end of the sliding bars, and after having performed their part retreat by the reaction of springs, and after this part has been performed the point is complete.

If it is desired to form what is termed a "hollow point," I employ a smaller mill or grinder for the last cut upon the point, (see Fig. 24, and in Fig. 25 enlarged,) the diameter of the mill being such as will give the required curve to the point, as see Fig. 25.

Constant grinding on one part of the mill would soon wear or dull the mill. To avoid this and make the wear equal on the entire face of the mill, I give to the mill-carrier a lateral movement by means of an incline plane, 36, (see Fig. 24,) actuated by an eccentric, 37, on the shaft B. This said incline plane during each operation of the mill is moved forward and forces the mills gradually to one side, allowing them to cut or grind across their entire face instead of one part, as they otherwise do.

To move all the mills by one operation I connect them together by a link, 38. So far the operation serves only for a flat-faced mill, as the first and last in Fig. 24; but I prefer a single cam for each, as shown and before described. For the middle or V-faced mill an additional movement is required, which is shown in Fig. 26, (enlarged to full size.) Underneath the carrier $s'$ and on the support T, I form a V-guide, 39, corresponding to the V of the mill, and on the under side of the carrier $s'$, I fix a stud, 40, which, as the mill-carrier moves from one side to the other, rides down into the V 39 on one side and out on the other side—that is, starting from the position in black, rides down to the position in red, cutting or grinding the left side of the wire 41, and entirely across one side of the V-mill; then from the position in red to the position in blue, grinding the other side of the wire, and using the entire face of that side of the V-mill. The point completed, the wire is advanced for the sixth and last operation of the machine, which is bending. This is performed by the mechanism shown enlarged in Fig. 13. The barbed and pointed wire advances by the action of the carrier, as before described, until the wire rests on a sub-former $v$, below the bender $T^2$. (Shown still more enlarged in Figs. 14 and 15.) This sub-former is hung in a bearing, $v'$. Its operation is more fully shown hereinafter. The said bender $T^2$ must be of the form required for the hook. It is fixed to a shaft on which is a pinion, $n'$. A segment-gear lever, $n^2$, hung upon a fulcrum, $n^3$, meshes into the said pinion. A cam, $A^8$, on the driving-shaft B, through its connection $B^8$, raises the segment and turns the bender $T^2$. In the act of turning, the notch in the bender catches the barb, as seen in Fig. 14, holds and draws the wire in, carrying the point around with it, and as the bender turns the sub-former $v$ is drawn under the bender from the position in Fig. 14 into the position in Fig. 15, and its form corresponding to that of the bender gives to the back of the hook the peculiar form required. The form may be varied by changing the bender and sub-former to give the desired form; or, if a straight back only is required, the sub-former may be dispensed with and a straight block set into its place; or if the so-called "Kirby bend" is required, insert the former shown in Figs. 27 and 28. A spiral groove in the said bender guides the back of the hook out of a line with the point. The first bend described is known as the "Limerick," in which the point and back are in line, while in the Kirby bend the hook is spiral—that is, the point is to one side of the line of the back of the hook. The hook is now complete and perfect, ready for tempering. Consequently I now throw it from the machine. To do this a lever, U, (see Fig. 1,) by the action of the cam U', operates a sleeve, $a^5$, on the bender-shaft. On this sleeve is a projection or pin extending through the plate $a^6$, on which is the bender. After the hook is bent and complete the sleeve $a^5$ is moved toward the former, and the pin forces the hook from the bender, from thence to be removed to be tempered.

The various parts of my machine I make adjustable, that I may make various sizes and styles of hooks. These adjustments are shown in the drawings, and will need no further explanation to persons skilled, as they are made by common and well-known devices.

I have illustrated and described my machine as performing the several operations in a right line. This is not essential, as the carrier may be rotary, and instruments for performing the several operations placed around the circle, as shown in Fig. 16. N is the carrier, which has a rotary movement given to it corresponding to the lateral movement of the carrier in the first illustration. It is also raised in like manner as in the first. In this, however, I form the head before the wire is run into the machine, but do it in like manner as in the first-described arrangement. I also hold each piece of wire separately by springs 2. (See Fig. 17.) The wire, after being headed, is forced under the springs, cut off, and the several operations performed by the instruments already described. The same letters in first description alike refer to both illustrations, and when finished the hook is taken from the machine, as before described. For some kinds of hooks this arrangement may be the better one.

A rotary carrier may be set vertically, as in Fig. 18 in this illustration. N is the carrier, with notches in its periphery corresponding to the notches in the carrier in the first illustration. $c'$ is a metallic strap (corresponding to the holder $c'$ in the first illustration) to hold the several wires in the notches. The wire in this case I would head, as in the last, before running it into the carrier. K is a guide, (see Fig. 19,) corresponding to the guide in the first illustration, to revolve with the carrier. In this guide I make a groove, as in the first illustration, in which the flattened head is inserted to prevent the wires from turning as the carrier revolves. I would employ the same instruments to perform the several operations as in the other two descriptions, but in this would set them axially with the carrier and move the carrier to and from the instrument axially for each operation, to correspond with the up-and-down movement of the carrier in the two cases before described.

The manner of operating the several instruments in these rotary carriers from one or more shafts will readily suggest itself to any one conversant with machinery, and therefore needs no description in detail.

I have thus far described but one form of head for the hook; but it will be plainly seen that other forms, as shown in Fig. 20, may be formed by substantially the same device; but I illustrate a method of making this peculiar form of head in Figs. 22 and 23. I employ two rotary carriers, the same in construction as in Fig. 16. I connect the two by gearing, that both may move simultaneously. I feed the wire in and cut it off, as before described, except that I cut off before the inner end shall have quite reached the stop, as at $x$. (Wire denoted in blue.) As each piece is entered and cut off the carriers rotate one space; another is entered and cut off, and so on in like manner as first described. Fig. 23 is a section through the heading-instruments. Z Z are cam-rolls geared together. At each movement of the carriers one of the pieces of wire is passed between the two rolls, and at the required instant the cam part of the rolls comes together upon the wire and forces the wire forward and against the stop. In this operation the cam part of the rolls is so formed as to draw the end of the wire down to the required form, as in Fig. 20. This being accomplished, another movement of the carriers presents a second for a like operation, and so on until the first is set between clamp $x'$. This clamp has a lateral movement given to it from a cam, and after grasping the wire draws it out from the first carrier and forces it into the second, (as denoted in red,) thence it is advanced for the performance of the several operations, and by the instruments as before described; or an eye (as in Fig. 21) may be formed by introducing, in place of the lever described, a mechanism such as described for bending the hook; or other forms by equivalent devices may be produced from one machine.

Having thus fully set forth and described my invention, what I claim thereon as new and useful, and desire to secure by Letters Patent, is—

1. The combination of an intermittent feeding device with a cutter, L, or its equivalent, when both are constructed substantially as set forth.

2. The combination of a carrier constructed and operating as described, producing intermittingly a progressive translatory movement of the blank with a cutter, L, and header B$^4$, or their equivalents, substantially as described.

3. The combination of a carrier constructed and operated as described, producing intermittingly a progressive translatory movement of the blank with header B$^4$ and barb cutting instrument P$^2$, or their equivalents, substantially as described.

4. The presser 13, when formed so as to press upon the blank forward of the barb to bend the blank over the bed P', on which it rests, and to prevent the barb from curling over, substantially as set forth.

5. The combination of the holder 14, back of the barb-cutting instrument, with the presser 13, forward of the barb-cutting instrument, substantially as and for the purpose specified.

6. The combination of the holder 14, back of the barb-cutting instrument, and the presser 13, forward of the barb-cutting instrument, with the block or bed P', on which the blank rests, substantially as and for the purpose set forth.

7. The combination of the holder 14, back of the barb-cutting instrument, the presser 13, forward of the barb-cutting instrument, and the bed P', on which the blank rests, with the barb-cutting instrument P$^2$, substantially as described.

8. The combination of a carrier constructed and operating as described, producing intermittingly a progressive translatory movement of the blank, with barb-cutting instrument P$^2$, and one or more pairs of pressing or clipping dies, substantially as specified.

9. The combination of a carrier constructed and operating as described, producing intermittingly a progressive translatory movement of the blank, with one or more pairs of pressing or clipping dies, barb-cutting instrument, cutter L, or its equivalent, and intermittent feeding device, substantially as described.

10. The combination of a carrier constructed and operating as described, producing intermittingly a progressive translatory movement of the blank, with one or more pairs of pressing or clipping dies, barb-cutting instrument P$^2$, and header B$^4$, or their equivalents, substantially as specified.

11. The combination of a carrier constructed and operating as described, producing intermittingly a progressive translatory movement of the blank, with one or more pairs of pressing or clipping dies and one or more milling devices, substantially as set forth.

12. The combination of a carrier constructed and operating as described, producing intermittingly a progressive translatory movement of the blank, with two or more pair of pressing or clipping dies, substantially as specified.

13. The combination of a carrier constructed and operating as described, producing intermittingly a progressive translatory movement of the blank with two or more milling devices, S, substantially as described.

14. The combination of a carrier constructed and operating as described, producing intermittingly a progressive translatory movement of the blank with a barb-cutting instrument and one or more milling devices, substantially as set forth.

15. The combination of a carrier constructed and operating as described, producing intermittingly a progressive translatory movement of the blank, with a header, barb-cutting instrument, and one or more milling devices, substantially as described.

16. The combination of a carrier constructed and operating as described, producing intermittingly a progressive translatory movement of the blank, with a bender or former, T$^2$, substantially as described.

17. The combination of a carrier constructed as described, producing intermittingly a progressive translatory movement of the blank, with one or more milling devices, and a former or bender, T$^2$, substantially as set forth.

18. The combination of a carrier constructed as described, producing intermittingly a progressive translatory movement of the blank, with a barb-cutting instrument, and bender or former $T^2$, substantially as specified.

19. The combination of a carrier constructed and operating as described, producing intermittingly a progressive translatory movement of the blank, with a header, $B^4$, and barb-cutting instrument, substantially as described.

20. The combination of a carrier constructed and operating as described, producing intermittingly a progressive translatory movement of the blank, with a bender, $T^2$, and cutting device L, substantially as described.

21. The combination of a carrier constructed and operating as described, producing intermittingly a progressive translatory movement, with a grooved guide, 15, substantially as and for the purpose specified.

22. The combination of a carrier constructed and operating as described, producing intermittingly a progressive translatory movement of the blank, with a holder, $c'$, which grasps and securely holds the blanks during their movement from one instrument to another, substantially as set forth.

23. The combination of a carrier constructed and operating as described, producing intermittingly a progressive translatory movement of the blank, and a holder, $c'$, which grasps and securely holds the blanks during their movement from one instrument to another, with a bender, $T^2$, substantially as described.

24. The combination, in one machine, of an intermittent feeding device, cutter L, a carrier constructed and operating as described, header $B^4$, barb-cutter $P^2$, pointing devices, and bender $T^2$, or their equivalents, in the manner and for the purpose substantially as herein set forth.

25. The adjusting-guide $P^3$, for regulating the depth of the cut, in combination with the barb-cutting instrument P, substantially as described.

C. O. CROSBY.

Witnesses:
CHARLES A. CROSBY,
JOHN E. EARLE.